(12) United States Patent
Tan et al.

(10) Patent No.: US 11,354,138 B1
(45) Date of Patent: Jun. 7, 2022

(54) OPTIMIZING PLUGIN LOADING

(71) Applicant: Dell Products L.P., Round Rock, TX (US)

(72) Inventors: Danilo O. Tan, Austin, TX (US); Srikanth Kondapi, Austin, TX (US); Brijesh Mishra, Murphy, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/483,455

(22) Filed: Sep. 23, 2021

(51) Int. Cl.
   *G06F 9/445*     (2018.01)
   *G06F 9/4401*    (2018.01)
   *G06F 9/50*      (2006.01)

(52) U.S. Cl.
   CPC ........ *G06F 9/44526* (2013.01); *G06F 9/4411* (2013.01); *G06F 9/505* (2013.01)

(58) Field of Classification Search
   None
   See application file for complete search history.

(56) References Cited

U.S. PATENT DOCUMENTS

| | | | | |
|---|---|---|---|---|
| 7,171,674 | B2 * | 1/2007 | Arrouye | G06F 9/44521 719/331 |
| 8,046,779 | B2 * | 10/2011 | Wusthoff | G06F 9/44521 717/162 |
| 8,595,487 | B2 * | 11/2013 | Govil | G06F 21/53 713/165 |
| 9,047,162 | B2 * | 6/2015 | Ward | G06F 9/44536 |
| 10,430,266 | B2 * | 10/2019 | Adler | G06F 11/0778 |
| 10,445,112 | B2 * | 10/2019 | Sirajuddin | G06F 9/44521 |
| 2004/0015877 | A1 * | 1/2004 | Arrouye | G06F 9/44521 717/127 |
| 2004/0034860 | A1 * | 2/2004 | Fernando | G06F 9/46 719/315 |
| 2008/0163185 | A1 * | 7/2008 | Goodman | G06F 9/44521 717/151 |

* cited by examiner

*Primary Examiner* — Umut Onat
(74) *Attorney, Agent, or Firm* — Kirton McConkie; Brian Tucker (57) ABSTRACT

Plugin loading can be optimized. A service can use a plugin loader to load plugins on a computing device. When the plugin loader loads plugins, the plugins can be configured to determine their load statuses and report such load statuses to the plugin loader. After receiving the load statuses, the plugin loader can store the load statuses and then notify the service to request a restart. When the service restarts the plugin loader, the plugin loader can use the load statuses to determine which of the plugins should be loaded. In this way, the service and plugin loader can ensure that only plugins that are appropriate for a particular computing device will remain loaded.

20 Claims, 9 Drawing Sheets

OPTIMIZING PLUGIN LOADING

CROSS-REFERENCE TO RELATED APPLICATIONS

N/A

BACKGROUND

Many tasks can be performed on a computing device using background services. For example, a background service may perform session-less tasks such as gathering telemetry data, perform long-running tasks such as data encryption or perform escalated tasks such as accessing BIOS. Oftentimes, these background services perform such functionality via plugins which may be in the form of dynamic-link libraries (DLLs).

Although computing devices have different hardware and software, the same set of plugins are oftentimes loaded. Therefore, on any given computing device, there will typically be plugins that are loaded to manage hardware or software that does not exist on the computing device. Even though they are not needed, such plugins will still be loaded and will remain in memory and consume resources. Similarly, some plugins may be loaded to perform a quick function and will then remain loaded indefinitely even though they may not be used again or may remain idle for extended periods of time.

One way to address the wastefulness of loading plugins that are not necessary is to create a manifest or other logic that defines which plugins should be loaded. However, this requires advanced knowledge of the computing device's hardware and/or software configuration and may likely require manual input. Therefore, plugin providers will typically choose the wastefulness of loading unnecessary plugins over the tedious and manual process of creating a manifest.

BRIEF SUMMARY

The present invention extends to systems, methods and computer program products for optimizing plugin loading. A service can use a plugin loader to load plugins on a computing device. When the plugin loader loads plugins, the plugins can be configured to determine their load statuses and report such load statuses to the plugin loader. After receiving the load statuses, the plugin loader can store the load statuses and then notify the service to request a restart. When the service restarts the plugin loader, the plugin loader can use the load statuses to determine which of the plugins should be loaded. In this way, the service and plugin loader can ensure that only plugins that are appropriate for a particular computing device will remain loaded.

In some embodiments, the present invention may be implemented as a method for optimizing the loading of plugins. In conjunction with a service being loaded on a computing device, a plugin loader can be started. The plugin loader can load a plurality of plugins for the service. The plugin loader can then receive a load status from each of the plurality of plugins. The plugin loader can store the load status for each of the plurality of plugins. The plurality of plugins can be unloaded. Then, a subset of the plurality of plugins can be reloaded based on the load status for each of the plurality of plugins.

In some embodiments, the present invention may be implemented as computer storage media having computer executable instructions which when executed implement a method for optimizing the loading of plugins. A service executing on a computing device can start a plugin loader. The plugin loader can load a plurality of plugins that are available on the computing device. Each of the plurality of plugins can determine a load status. Each of the plurality of plugins can report the load status to the plugin loader. The plugin loader can store the load status for each of the plurality of plugins. The plurality of plugins can be unloaded. A first subset of the plurality of plugins can then be reloaded while forgoing reloading a second subset of the plurality of plugins, where the first subset of the plurality of plugins have a first load status and the second subset of the plurality of plugins have a second load status.

In some embodiments, the present invention may be implemented as a computing device having one or more processors and computer storage media having computer executable instructions which when executed by the one or more processors implement a method for optimizing the loading of plugins. A service that uses a plugin loader to load plugins can be executed. The plugin loader can load a plurality of plugins. While the plugins are loaded, the plugin loader can receive a load status from each of the plurality of plugins. The plurality of plugins can then be unloaded. A subset of the plurality of plugins that have a first load status can be identified. The subset of the plurality of plugins can then be reloaded.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
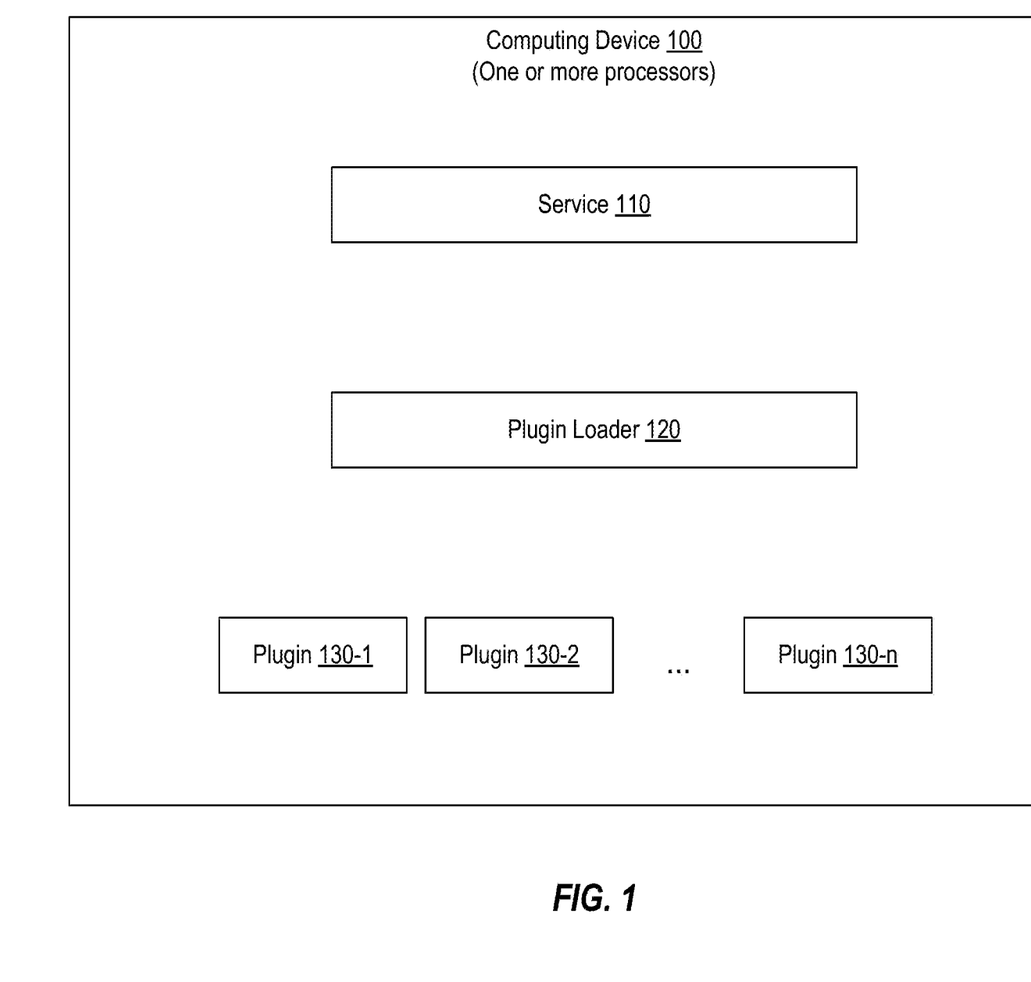
FIG. 1 provides an example of how a computing device may be configured when one or more embodiments of the present invention are implemented.

FIG. 1 provides an example of a computing device 100 that is configured in accordance with one or more embodiments of the present invention. Computing device 100 includes a service 110, which may be a background service, a plugin loader 120 and a plurality of plugins 130-1 through 130-*n* (generally or collectively plugin(s) 130). Service 110 can employ plugin loader 120 to load plugins 130 to provide some functionality for service 110. Plugins 130 could provide a variety of functionality such as, but not limited to, telemetry gathering, encryption, BIOS access, hardware access/management, etc.

Figure 2A:
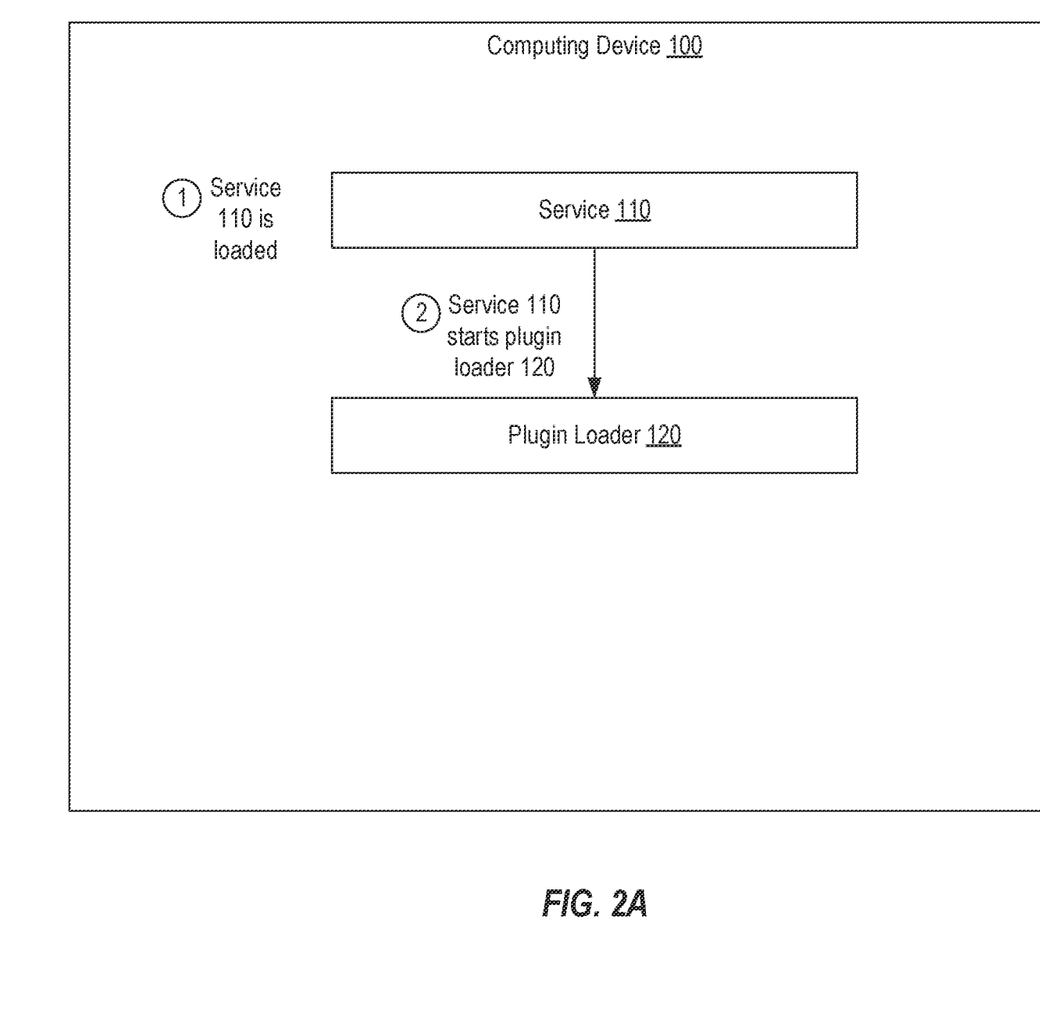
FIGS. 2A-2H provide an example of how the loading of plugins can be optimized in accordance with one or more embodiments of the present invention.

FIGS. 2A-2H provide an example of how service 110 and plugin loader 120 can optimize the loading of plugins 130 in accordance with one or more embodiments of the present invention. Turning to FIG. 2A, in step 1, it is assumed that service 110 is loaded on computing device 100. For example, in some embodiments, service 110 could be loaded as part of startup on computing device 100. However, service 110 could be loaded at any suitable time. In step 2, service 110 can start plugin loader 120.

Figure 2B:
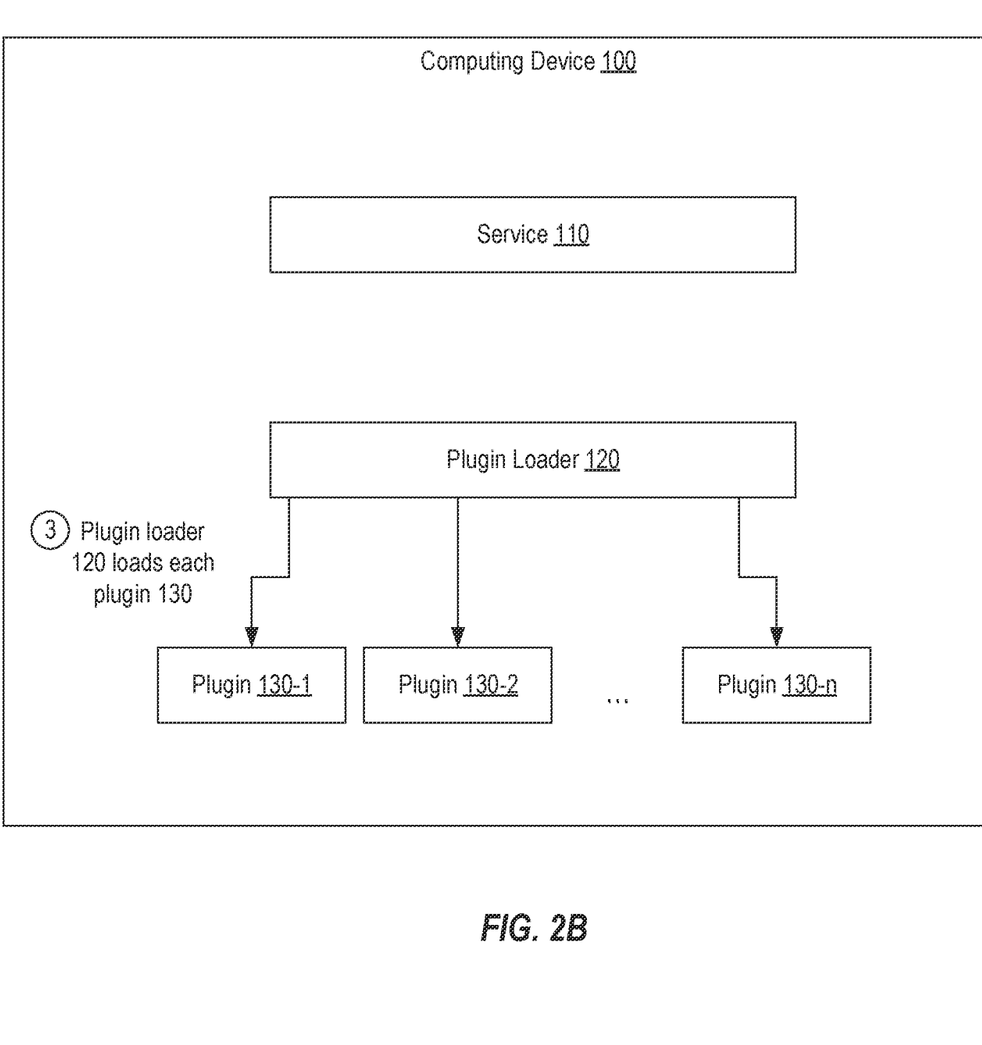

Turning to FIG. 2B, in step 3, plugin loader 120 can identify available plugins 130 on computing device 100, possibly authenticate them (e.g., via signature checks) and load them. Notably, at this step, plugin loader 120 will load each available plugin 130 on computing device 100 (or at least those that it authenticates), some or which may not be needed on computing device 100.

Figure 2C:
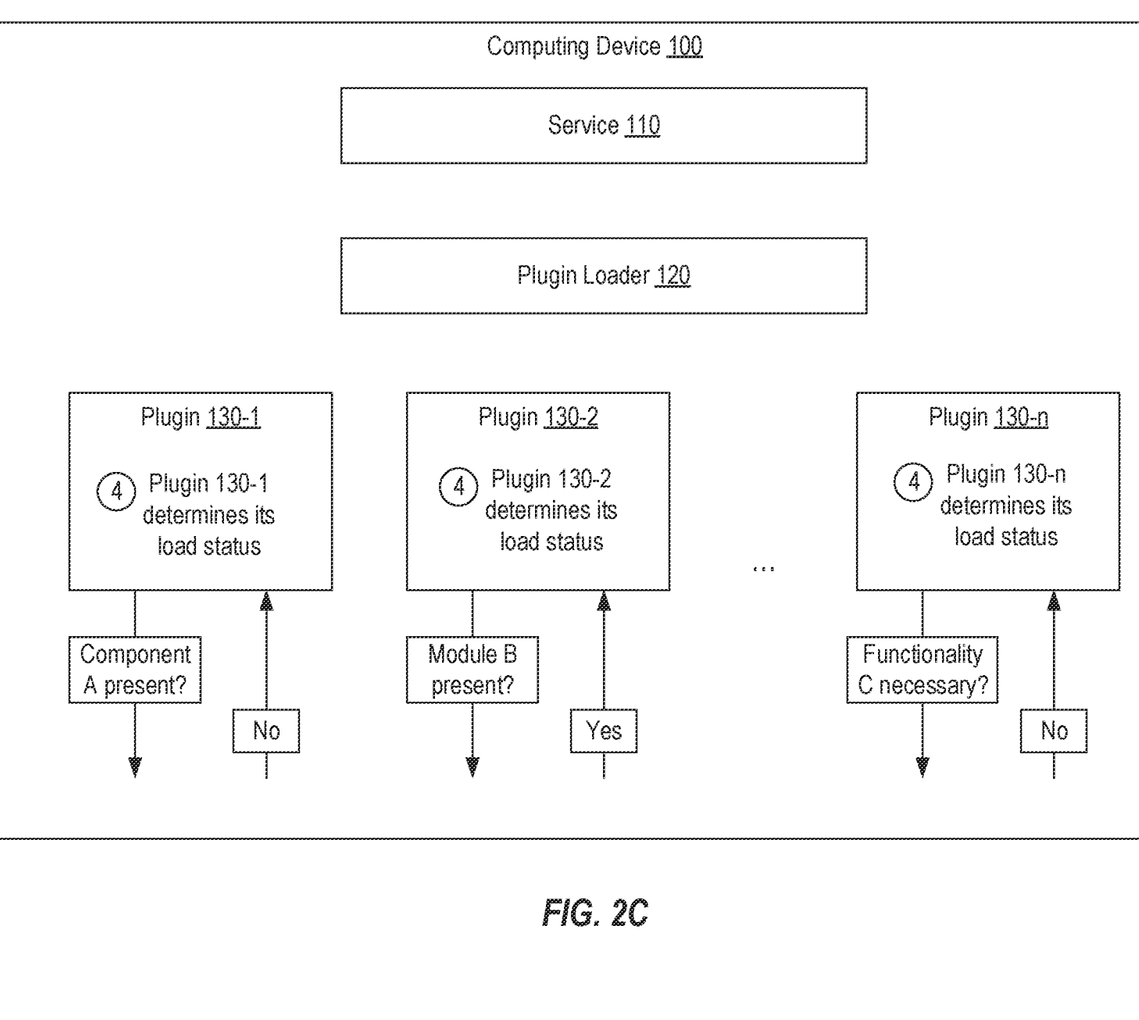

Turning to FIG. 4, after each plugin 130 is loaded and in step 4, each plugin 130 can determine its load status. As represented, this determination of load status can be different for each plugin 130. For example, plugin 130-1 is shown as determining its load status by determining whether a component A is present on computing device 100. As one example only, component A could be a component that is a source of telemetry data that service 110 may obtain via plugin 130-1. In this example, it is assumed that plugin 130-1 determines that component A is not present on computing device 100 and therefore plugin 130-1 may determine that its load status is "unload" given that it cannot perform the functionality that it is intended to provide to service 110.

Plugin 130-2 is shown as determining its load status by determining whether module B is present on computing device 100. As one example only, component B could be a user presence detect module that service 110 interfaces with via plugin 130-2 to determine the presence of a user in front of computing device 100. In this example, it is assumed that plugin 130-2 determines that module B is present on computing device 100 and therefore plugin 130-2 may determine that its load status is "load" given that it can perform its intended functionality for service 110.

Plugin 130-n is shown as determining its load status by determining whether functionality C is necessary on computing device 100. As one example only, functionality C could be data encryption that plugin 130-n is intended to perform for service 110. In this example, it is assumed that plugin 130-n determines that functionality C is not necessary (or not possible, appropriate, available, etc.) on computing device 100 and therefore plugin 130-n may determine that its load status is "unload" given that it cannot (or should not) perform its intended functionality for service 110.

As another example, a plugin 130 could determine that its load status is "unload" after performing some functionality and then determining that it no longer needs to perform the functionality. For example, a plugin 130 could perform a quick task and then determine that it does not need to perform further functionality.

Accordingly, a plugin 130 may use a variety of techniques or factors to determine its load status on any given computing device 100. In other words, plugins 130 can perform any suitable functionality to determine whether it should remain loaded on any particular computing device 100.

Figure 2D:
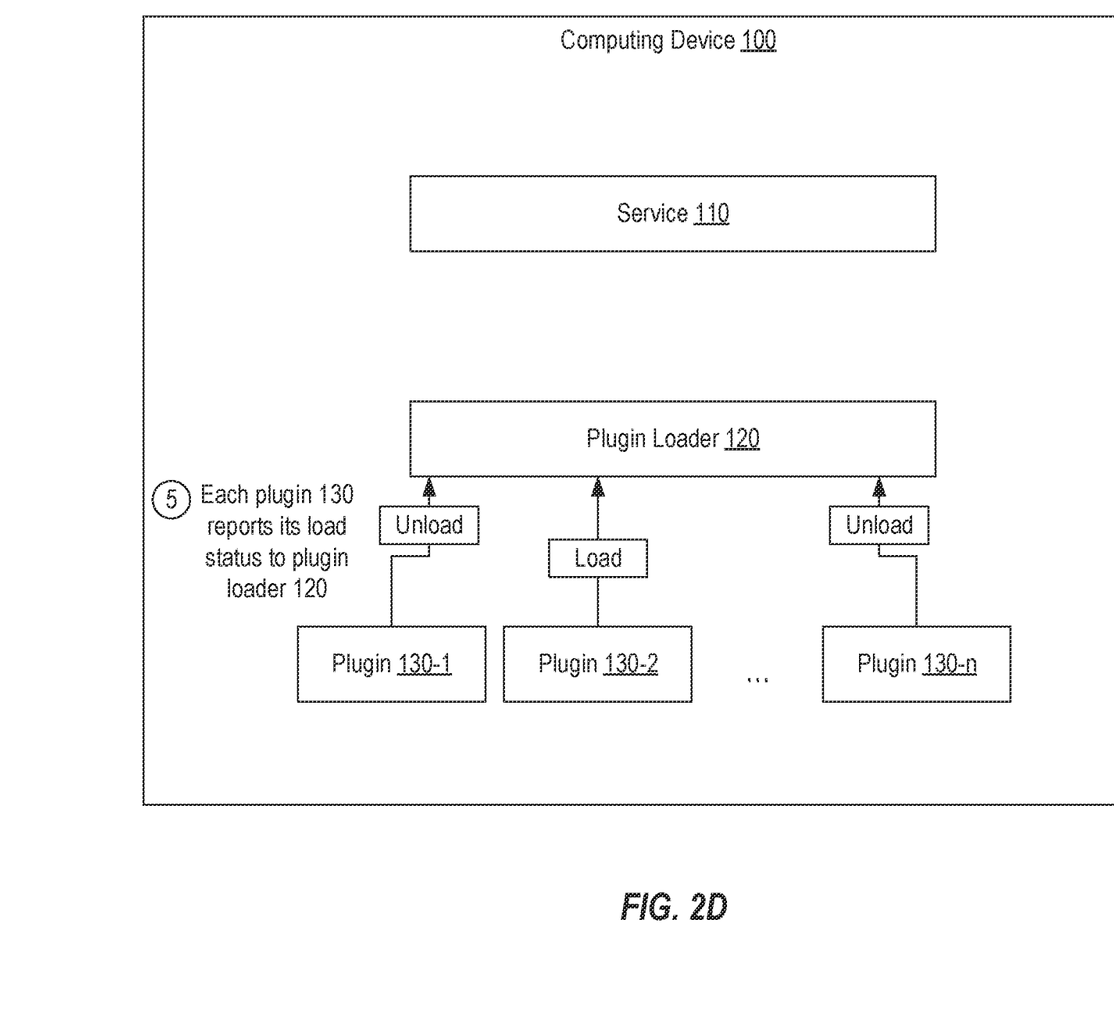

Turning to FIG. 2D, in step 5, each plugin 130 can report its load status back to plugin loader 120. For example, after determining their load statuses and possibly performing other functionality, plugins 130-1 and 130-n can notify plugin loader 120 that their load status is "unload," while plugin 130-2 can notify plugin loader 120 that its load status is "load." In some embodiments, plugin loader 120 can be configured to wait for each plugin 130 that it loads to report its load status, while in other embodiments, plugin loader 120 could wait a defined period of time to receive load statuses after which it may assign a default load status (e.g., "unload") to any plugin 130 from which it has not received a load status. In any case, after step 5, plugin loader 120 will have determined a load status for each plugin 130.

Figure 2E:
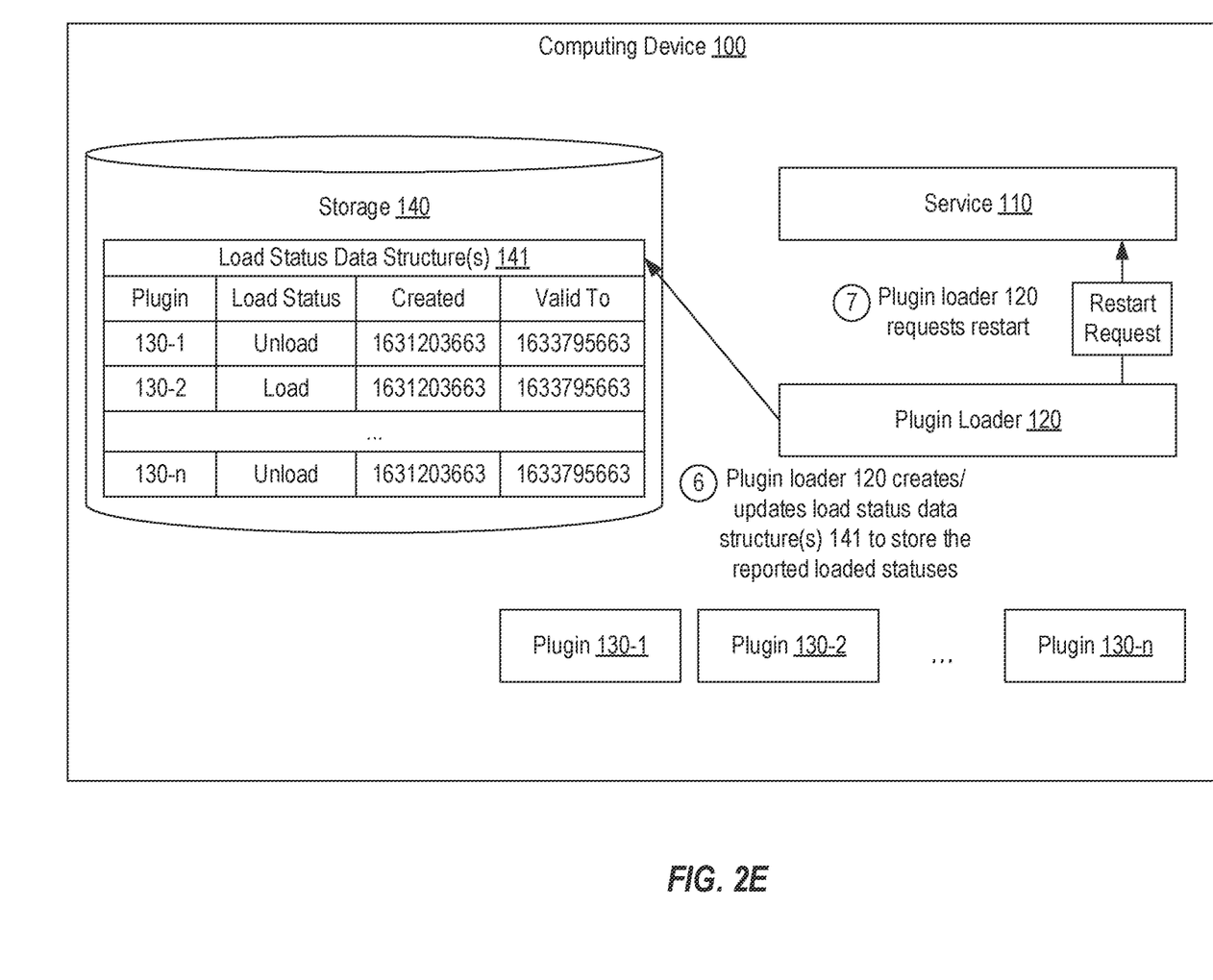

Turning to FIG. 2E, in step 6, plugin loader 120 can create or update a load status data structure (or structures) 141 to store the load statuses for plugins 130. As shown, load status data structure 141 can be maintained in a storage 140 which can be non-volatile to ensure that load status data structure 141 can be maintained across reboots. For example, storage 140 could represent the registry, the file system, a network location, the cloud, etc.

In some embodiments, in addition to storing the load status for each plugin 130 available on computing device 100, plugin loader 120 may also store a creation time and a validity period for each load status. For example, load status data structure 141 is shown as including a "Created" field and a "Valid To" field, both of which store timestamps defining when the respective load status was created and when it expires respectively. In this example, the Created timestamps for plugins 130 are all the same, but this need not be the case. Similarly, the Valid To timestamps for plugins 130 are all the same, and represent a validity period of one month, but this need not be the case. For example, plugin loader 120 could be configured to require some plugins 130 to redetermine their load statuses at different intervals, may detect newly available plugins 130 at a subsequent time or otherwise may obtain a plugin 130's load status at or set its validity period to a different time relative to other plugins 130.

In step 7, which plugin loader 120 may perform after or in conjunction with storing the load statuses for each plugin 130, plugin loader 120 may communicate with service 110 to request a restart. Plugin loader 120 may use any suitable mechanism for accomplishing this.

Figure 2F:
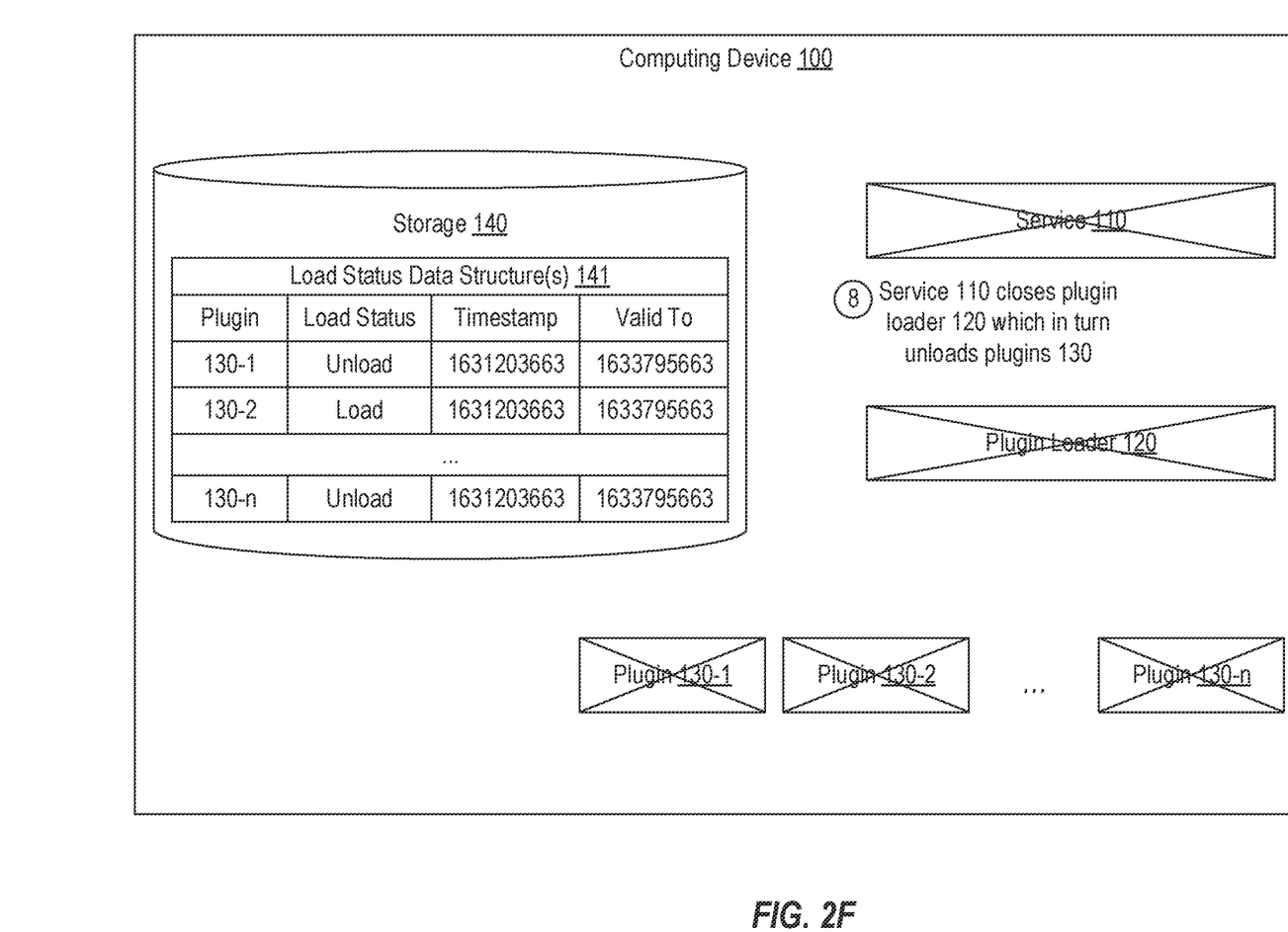

Turning to FIG. 2F, in step 8, service 110 can close plugin loader 120 (or otherwise terminate it) which in turn will cause each of plugins 130 to be unloaded. Notably, although plugin loader 120 is closed, load status data structure 141 remains in storage 140. Service 110 can close plugin loader 120 in any suitable manner. For example, in some embodiments, plugin loader 120 may be a component of service 110 and service 110 may close plugin loader 120 by causing itself to be restarted. In other embodiments, service 110 may be configured to restart plugin loader 120 without causing itself to be restarted.

Figure 2G:
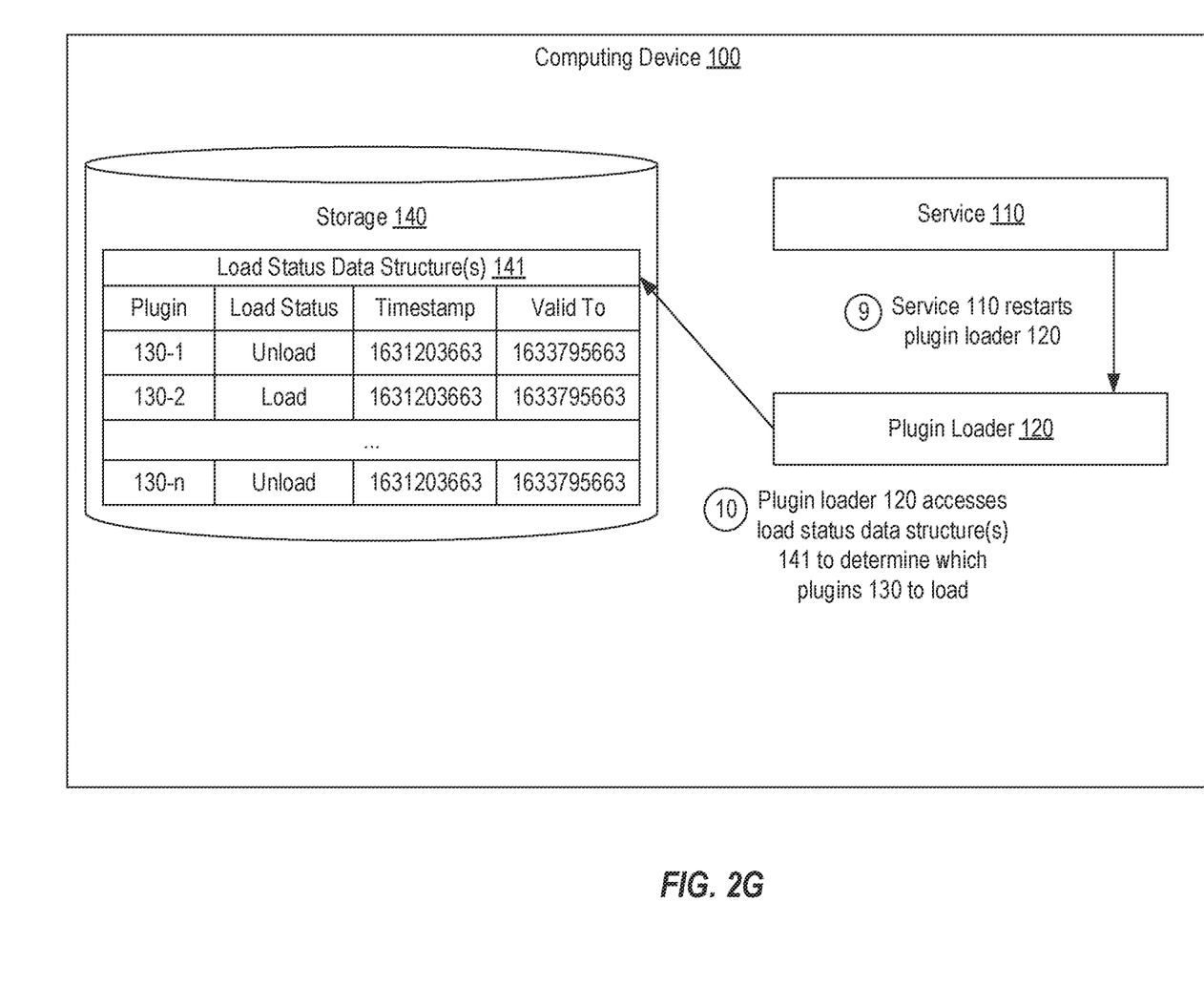

Turning to FIG. 2G, in step 9, service 110 can restart plugin loader 120, which as stated above, may entail restarting itself. Then, in step 10, plugin loader 120 can detect load status data structure 141 and access it to determine which plugins 130 to load. In this example, plugin loader 120 will determine that plugin 130-2 has a load status of "load" and should therefore be loaded, while plugins 130-1 and 130-n have load statuses of "unload" and should therefore not be loaded.

Figure 2H:
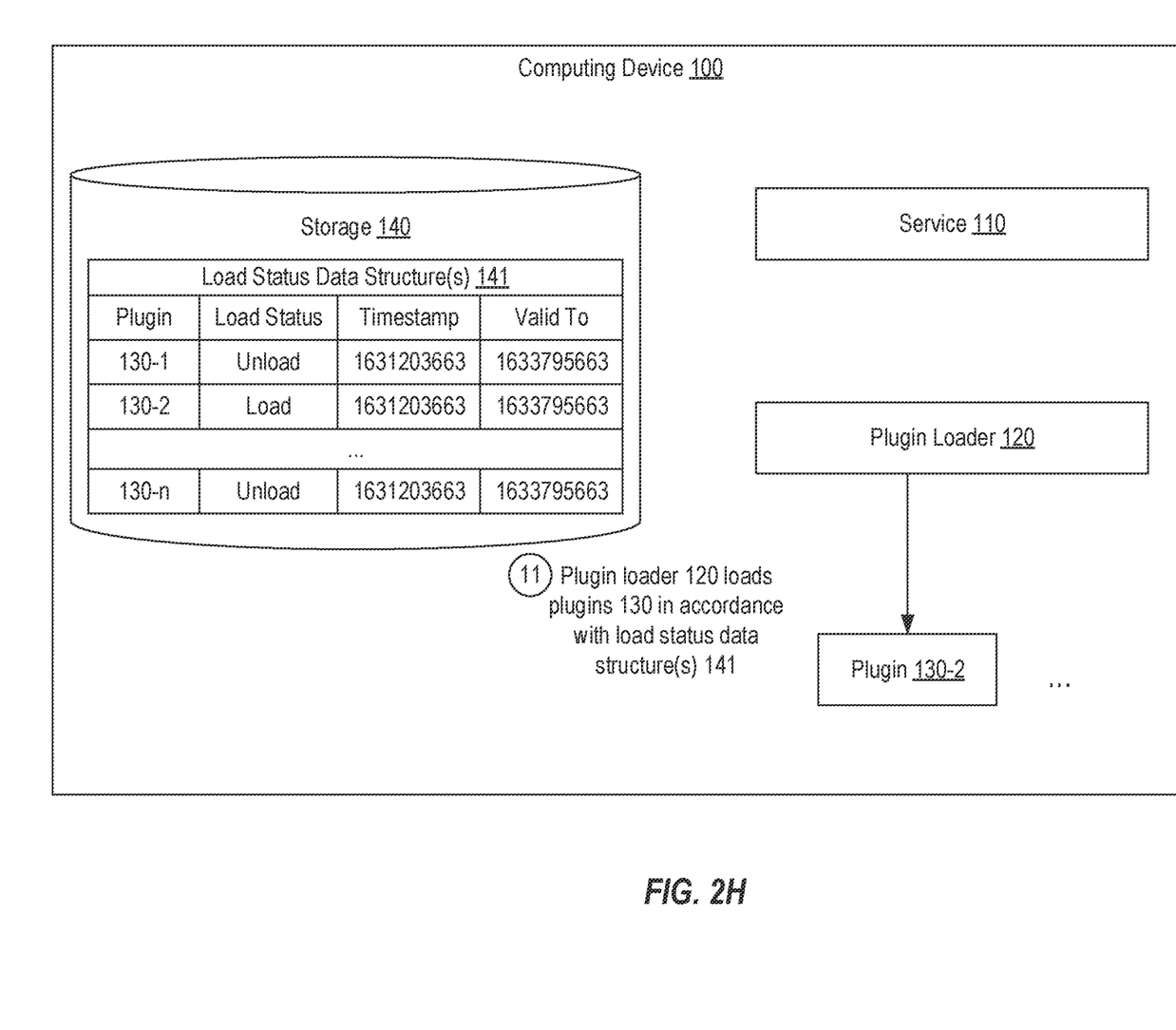

Turning to FIG. 2H, in step 11, plugin loader 120 can load plugins 130 in accordance with load status data structure 141. In this example, plugin loader 120 can load plugin 130-2 while not loading plugins 130-1 and 130-n. In this way, plugin loader 120 can prevent unnecessary plugins 130 from being loaded and consuming resources.

Each subsequent time that plugin loader 120 is started (e.g., at each reboot), it can perform steps 9-11 to ensure that only plugins 130 with a load status of "load" are loaded on computing device 100. Also, if in step 10, plugin loader 120 determines that the load status for a particular plugin 130 has expired (e.g., if the current timestamp is later than the Valid To timestamp), plugin loader 120 can cause the particular plugin 130 to be loaded even if its load status is "unloaded" so that it may repeat steps 4 and 5 to update its load status. This can ensure that the particular plugin 130 will eventually be loaded and may detect if any hardware and/or software changes have been made to computing device 100 that would cause its load status to be different. Also, in some embodiments, service 110 can be configured to detect when hardware and/or software changes have occurred on computing device 100 and in response can cause plugin loader 120 to load each plugin 130 so that they may again determine their load status. For example, service 110 could accomplish this by deleting or invalidating load status data structure 141, specifically instructing plugin loader 120 to refresh load status data structure 141 or using any other suitable technique.

As can be seen, this process for optimizing the loading of plugins ensures that only relevant plugins will be loaded on a computing device without requiring any prior knowledge of the computing device's hardware and/or software configuration or capabilities. As a result, the computing device's resources can be more efficiently used when a service uses plugins.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for optimizing the loading of plugins, the method comprising:
    in conjunction with a service being loaded on a computing device, starting a plugin loader;
    loading, by the plugin loader, a plurality of plugins for the service;
    receiving, by the plugin loader, a load status of load or unload from each of the plurality of plugins, wherein a first subset of the plurality of plugins has the load status of load and a second subset of the plurality of plugins has the load status of unload;
    storing the load status for each of the plurality of plugins;
    unloading the plurality of plugins including the first subset of the plurality of plugins that has the load status of load and the second subset of the plurality of plugins that has the load status of unload; and
    after unloading the plurality of plugins, reloading the first subset of the plurality of plugins based on the load status of the first subset being load while not reloading the second subset of the plurality of plugins based on the load status of the second subset being unload.

2. The method of claim 1, further comprising:
    determining, by each of the plurality of plugins, the load status.

3. The method of claim 1, wherein the load status for each of the plurality of plugins is stored in association with a validity period.

4. The method of claim 1, wherein the load status for each of the plurality of plugins is stored in association with a creation time.

5. The method of claim 1, wherein the load status for each of the plurality of plugins is stored across reboots of the computing device.

6. The method of claim 1, wherein unloading the plurality of plugins comprises restarting the plugin loader.

7. The method of claim 1, wherein unloading the plurality of plugins comprises restarting the service.

8. The method of claim 1, further comprising:
    in conjunction with the service being subsequently loaded on the computing device, starting the plugin loader;
    accessing the stored load status for each of the plurality of plugins;
    loading the first subset of the plurality of plugins that have the load status of load; and
    forgoing loading the second subset of the plurality of plugins that have the load status of unload.

9. The method of claim 1, further comprising:
    in conjunction with the service being subsequently loaded on the computing device, starting the plugin loader;
    accessing the stored load status for each of the plurality of plugins;
    determining that the stored load status for the plurality of plugins has expired;
    loading the plurality of plugins;
    receiving a current load status from each of the plurality of plugins;

storing the current load status for each of the plurality of plugins; and reloading a subset of the plurality of plugins based on the current load status for each of the plurality of plugins.

10. The method of claim 1, wherein the load status for at least one of the plurality of plugins is based on availability of a component, module or functionality on the computing device.

11. One or more computer storage media having computer executable instructions which when executed implement a method for optimizing the loading of plugins, the method comprising:

starting, by a service executing on a computing device, a plugin loader;

loading, by the plugin loader, a plurality of plugins that are available on the computing device;

determining, by each of the plurality of plugins, a load status of load or unload;

reporting, by each of the plurality of plugins, the load status to the plugin loader, wherein a first subset of the plurality of plugins has the load status of load and a second subset of the plurality of plugins has the load status of unload;

storing, by the plugin loader, the load status for each of the plurality of plugins;

causing the plurality of plugins to be unloaded including the first subset of the plurality of plugins that has the load status of load and the second subset of the plurality of plugins that has the load status of unload; and reloading the first subset of the plurality of plugins while forgoing reloading the second subset of the plurality of plugins.

12. The computer storage media of claim 11, wherein causing the plurality of plugins to be reloaded comprises restarting the plugin loader.

13. The computer storage media of claim 11, wherein the method further comprises:

authenticating the plurality of plugins prior to loading the plurality of plugins.

14. The computer storage media of claim 11, wherein determining the load status comprises identifying availability of a component, module or functionality on the computing device.

15. The computer storage media of claim 11, wherein the method further comprises:

in conjunction with the service being subsequently executed on the computing device, loading the first subset of the plurality of plugins while forgoing loading of the second subset of the plurality of plugins based on the load status stored for each of the plurality of plugins.

16. The computer storage media of claim 11, wherein the method further comprises:

in conjunction with the service being subsequently executed on the computing device, loading, by the plugin loader, the plurality of plugins to cause each of the plurality of plugins to determine and report a current load status;

storing, by the plugin loader, the current load status for each of the plurality of plugins;

causing the plurality of plugins to be unloaded; and reloading a third subset of the plurality of plugins based on the current load status for each of the plurality of plugins.

17. A computing device comprising:

one or more processors; and computer storage media having computer executable instructions which when executed by the one or more processors implement a method for optimizing the loading of plugins, the method comprising:

executing a service that uses a plugin loader to load plugins;

loading, by the plugin loader, a plurality of plugins;

while the plugins are loaded, receiving, by the plugin loader, a load status of load or unload from each of the plurality of plugins;

causing the plurality of plugins to be unloaded including first subset of the plurality of plugins that has the load status of load and second subset of the plurality of plugins that has the load status of unload;

identifying that the first subset of the plurality of plugins have the load status of load; and reloading the first subset of the plurality of plugins while not reloading the second subset of the plurality of plugins.

18. The computing device of claim 17, wherein the method further comprises:

persisting the load status for each of the plurality of plugins across reboots of the computing device.

19. The computing device of claim 17, wherein the method further comprises:

in conjunction with the service being subsequently loaded on the computing device, starting the plugin loader;

accessing a stored load status for each of the plurality of plugins;

determining that the stored load status for the plurality of plugins has expired;

loading the plurality of plugins;

receiving a current load status from each of the plurality of plugins;

storing the current load status for each of the plurality of plugins; and reloading a subset of the plurality of plugins based on the current load status for each of the plurality of plugins.

20. The computing device of claim 17, wherein causing the plurality of plugins to be unloaded comprises one of:

restarting the plugin loader; or restarting the service.

\* \* \* \* \*